(12) United States Patent
Barnes et al.

(10) Patent No.: US 12,441,059 B2
(45) Date of Patent: *Oct. 14, 2025

(54) ENERGY EMITTING APPARATUSES FOR BUILD MATERIAL LAYERS

(71) Applicant: Peridot Print LLC, Palo Alto, CA (US)

(72) Inventors: Arthur H. Barnes, Vancouver, WA (US); William Winters, Vancouver, WA (US); Daniel Fredrickson, Vancouver, WA (US)

(73) Assignee: Peridot Print LLC, Palo Alto, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/559,963

(22) Filed: Dec. 22, 2021

(65) Prior Publication Data

US 2022/0111592 A1    Apr. 14, 2022

Related U.S. Application Data

(63) Continuation of application No. 16/505,503, filed on Jul. 8, 2019, now Pat. No. 11,241,832.

(51) Int. Cl.
*B29C 67/00* (2017.01)
*B29C 64/153* (2017.01)
*B29C 64/264* (2017.01)
*B33Y 30/00* (2015.01)

(52) U.S. Cl.
CPC .......... *B29C 64/264* (2017.08); *B29C 64/153* (2017.08); *B33Y 30/00* (2014.12)

(58) Field of Classification Search
CPC ... B29C 64/153; B29C 64/264; B29C 64/165; B29C 64/277; B29C 64/282; B29C 64/295; B33Y 10/00; B33Y 30/00; B33Y 50/00; B33Y 50/02
See application file for complete search history.

(56) References Cited

U.S. PATENT DOCUMENTS

| 5,164,128 | A | 11/1992 | Modrek |
| 5,168,193 | A | 12/1992 | Hoegler |
| 5,223,269 | A | 6/1993 | Walker |
| 5,323,269 | A | 6/1994 | Walker et al. |
| 6,621,087 | B1 | 9/2003 | Biesges |
| 9,529,263 | B2 | 12/2016 | Struewe |
| 11,241,832 | B2 * | 2/2022 | Barnes .................... B22F 12/44 |

(Continued)

FOREIGN PATENT DOCUMENTS

| CN | 109689342 | 4/2019 |
| DE | 102015006533 | 6/2016 |

(Continued)

*Primary Examiner* — Ryan M Ochylski
(74) *Attorney, Agent, or Firm* — Shook, Hardy & Bacon

(57) ABSTRACT

According to examples, an apparatus may include a back panel to absorb energy and an energy emitter to supply energy onto a build material layer. The energy emitter may include an energy emitting element and an outer tube. In addition, a reflective element may be provided on a portion of the outer tube facing the back panel to direct energy away from the back panel. The apparatus may also include a transparent panel, in which energy from the energy emitter may be emitted through the transparent panel and onto the build material layer.

10 Claims, 3 Drawing Sheets

(56) References Cited

U.S. PATENT DOCUMENTS

| | | |
|---|---|---|
| 2002/0015297 A1 | 2/2002 | Hayashi |
| 2009/0103905 A1 | 4/2009 | Tanino |
| 2010/0315803 A1 | 12/2010 | Inoue |
| 2016/0178138 A1 | 6/2016 | Jiang |
| 2018/0104896 A1 | 4/2018 | Lopez et al. |
| 2019/0111624 A1 | 4/2019 | Lee et al. |

FOREIGN PATENT DOCUMENTS

| | | | | |
|---|---|---|---|---|
| WO | WO-2017011456 A1 | * | 1/2017 | ............ B22F 3/1055 |
| WO | WO-2017131764 A1 | * | 8/2017 | ........... B29C 64/165 |
| WO | WO-2017219085 A1 | | 12/2017 | |

* cited by examiner

ENERGY EMITTING APPARATUSES FOR BUILD MATERIAL LAYERS

PRIORITY

This application is a Continuation of commonly assigned and co-pending U.S. patent application Ser. No. 16/505,503, filed Jul. 8, 2019, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and manufacturing. Some 3D printing techniques are considered additive processes because they involve the application of successive layers of material to an existing surface (template or previous layer). This is unlike traditional machining processes, which often rely upon the removal of material to create the final part. 3D printing may involve curing of a binding agent or fusing of the building material, which for some materials may be accomplished using heat-assisted melting, fusing, sintering, curing, or otherwise coalescing, and then solidification, and for other materials may be performed through UV curing of polymer-based build materials or UV curable agents.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
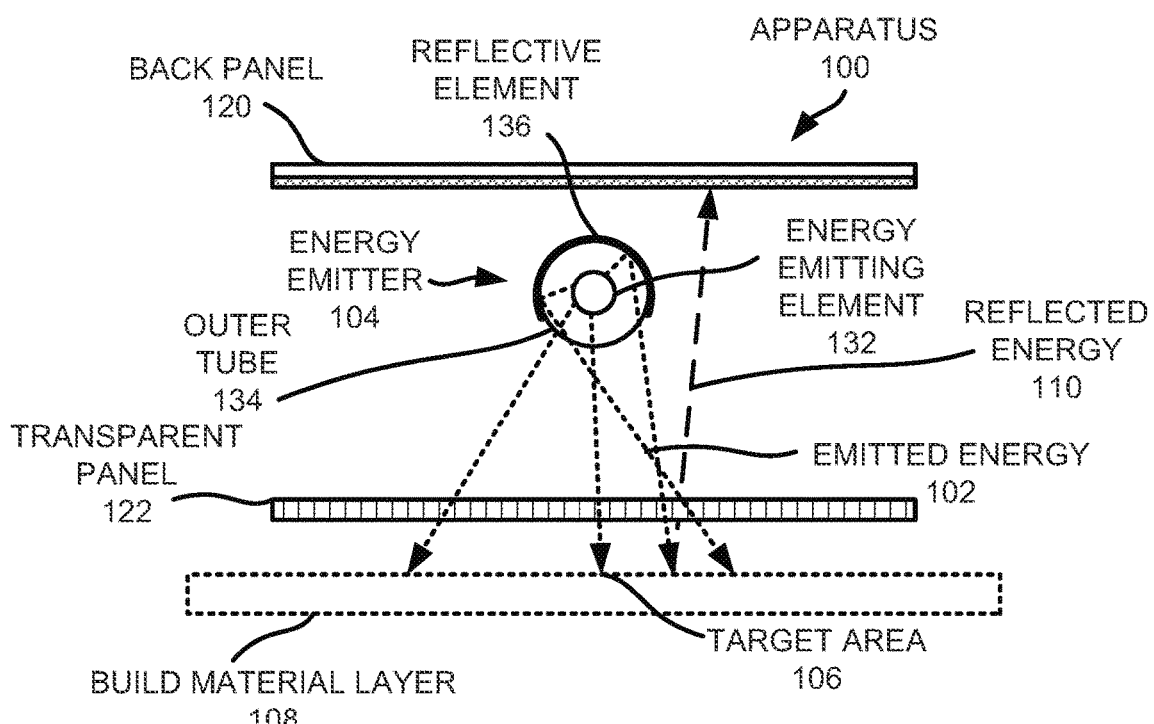
FIG. 1A shows a front view of an example apparatus for heating a build material layer to, for instance, fuse build material particles in selected locations in the build material layer.

Energy in the form or radiation, such as light, may be used in 3D printing processes to heat build material particles and/or a binding agent to cause the build material particles to be fused or coalesced together to form portions of 3D objects. That is, the energy may cause the build material particles to melt, fuse, sinter, cause a reaction with another material, or otherwise coalesce prior to or as part of being joined. In other instances, the energy may cause a binding agent to cure. As used herein, the term "coalesced" may be defined as the build material particles being solidified following being melted, fused, sintered, caused to have a reaction with another material, or otherwise joining together. In some 3D printing processes, the energy may be applied to coalesce build material positioned at selected locations. As such, the energy may not cause the build material particles outside of the selected locations to be coalesced. In one regard, the build material particles outside of the selected locations may not absorb the energy or may not absorb sufficient energy to be coalesced and may reflect some of the energy applied onto the build material particles. The amount of energy reflected from the build material particles may be dependent upon patterns of a fusing and/or binding agent applied to the build material particles. For instance, a larger pattern of fusing and/or binding agent may result in a lesser amount of reflected energy from the build material particles.

Some 3D printing processes may utilize a reflector to direct and focus the energy from an energy source to the build material particles and the energy reflected from the build material particles may be directed back to the reflector. The energy reflected from the build material particles may be reflected in the reflector and the reflector may direct at least some of the reflected energy back onto the build material particles. As a result, the build material particles may receive energy at levels that may exceed intended levels because the amount of energy reflected back onto the build material particles may be based on the pattern at which fusing and/or binding agent has been deposited may cause the amount of energy reflected back from the build material particles to be variable. This may result in improper coalescing of the build material particles and/or fuse energy distribution (or equivalently unintended thermal bleed) across the build material particles.

Disclosed herein are apparatuses for heating build material particles to selectively fuse build material particles in a build material layer to form part of a 3D object while limiting or preventing the re-supply of energy reflected from the build material particles to the build material particles. For instance, the apparatuses disclosed herein may include a back panel that may absorb energy, e.g., energy reflected back into the apparatuses from the build material particles. In addition, the apparatuses may include energy emitters that may have reflective elements that may block emission of energy from the energy emitters toward the back panel and may direct the emission of energy toward the build material particles. The apparatuses may also include transparent panels that may include anti-reflective coatings that may prevent or limit the reflection of energy that has been reflected from the build material particles from being reflected back to the build material particles. Instead, the anti-reflective coatings may cause the energy reflected from the build material particles to be directed through the transparent panels and absorbed by the back panels.

In some examples, the back panel may become heated as the back panel absorbs energy and may emit heat that may be at a different wavelength than the absorbed energy. For instance, the energy emitter may emit energy having a first wavelength that is within the visible wavelength range and the back panel and/or an energy absorbing material of the back panel may emit energy having a second wavelength that is within the, e.g., mid and far, infrared wavelength range. By way of example, the energy emitter may emit energy mostly in a near-IR wavelength range and the energy absorbing material may emit energy in the mid to far-IR wavelength range.

According to examples, the build material particles in a target area of a build material layer may absorb the energy having the second wavelength while at least some of the energy having the first wavelength may reflect off the build material particles. As such, the energy emitted from the back panel and/or the energy absorbing material of the back panel may raise the temperature of the build material particles, for instance, to a predefined temperature that may be lower than a melting temperature of the build material particles.

Through implementation of the apparatuses disclosed herein, the amount of energy applied to build material particles that are to be coalesced, e.g., fused, together as well as the amount of energy applied to build material particles that are not to be coalesced together may be controlled. For instance, the amount of energy applied may be controlled by reducing or eliminating the emission of energy reflected from the build material particles back to the build material particles.

Before continuing, it is noted that as used herein, the terms "includes" and "including" mean, but is not limited to, "includes" or "including" and "includes at least" or "including at least." The term "based on" means "based on" and "based at least in part on."

Figure 1B:
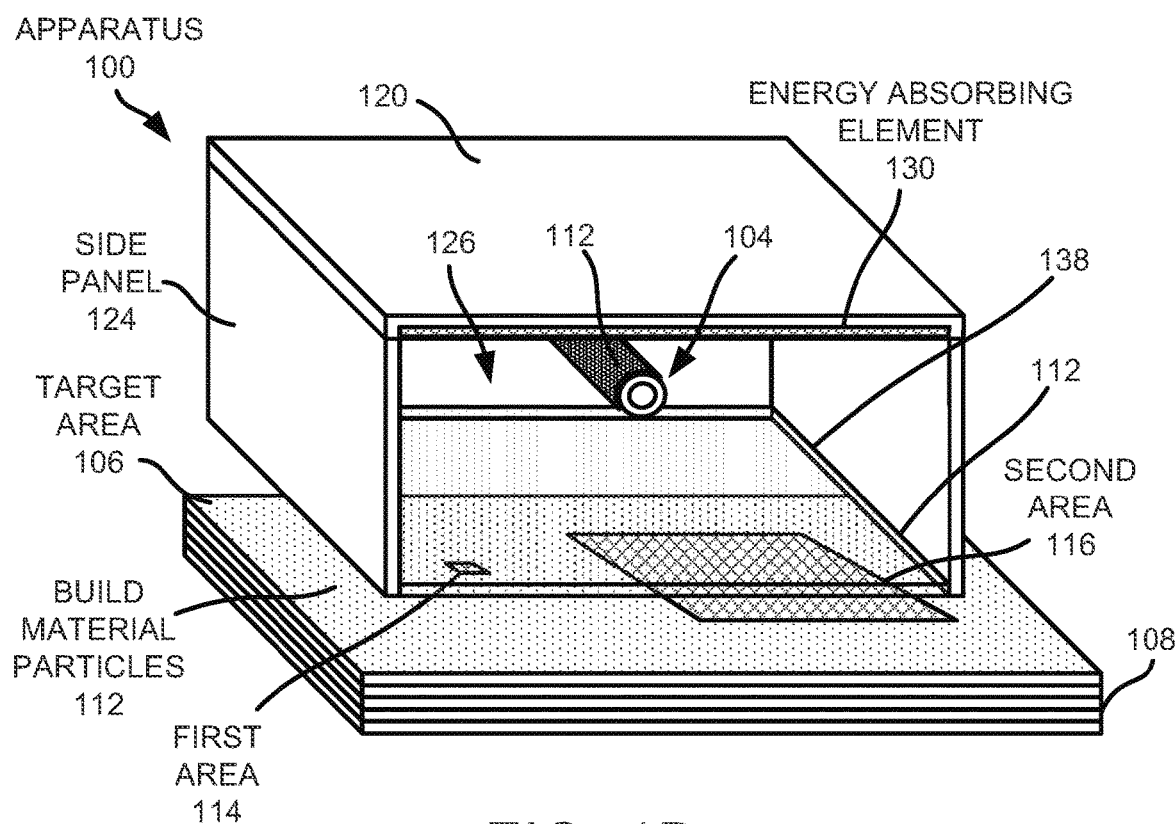
FIG. 1B shows a perspective view, in partial cross-section, of the example apparatus depicted in FIG. 1A.

Reference is first made to FIGS. 1A and 1B. FIG. 1A shows a front view of an example apparatus 100 for heating a build material layer 108 to, for instance, fuse build material particles 112 in selected locations in the build material layer 108. FIG. 1B shows a perspective view, in partial cross-section, of the example apparatus 100 depicted in FIG. 1A and build material layers 108. It should be understood that the example apparatus 100 depicted in FIGS. 1A and 1B may include additional components and that some of the components described herein may be removed and/or modified without departing from the scope of the example apparatus 100 disclosed herein.

Generally speaking, the apparatus 100 may be implemented to direct energy 102, or equivalently, radiation, light, or the like, emitted from an energy emitter 104 in the form of electromagnetic radiation, acoustic energy, or the like, onto a target area 106 of a build material layer 108 while preventing or limiting energy 110 reflected from the target area 106 from being directed back to the target area 106. That is, for instance, the reflected energy 110 from the target area 106 of the build material layer 108 may be absorbed into the apparatus 100 such that reflected energy 110 is not emitted back to the target area 106. The target area 106 may be, for instance, a build material layer 108 in which build material particles 112 positioned at selected areas of the layer 108 are to be fused together through receipt of the emitted energy 102.

The apparatus 100 may be moved laterally across the target area 106 to direct the emitted energy 102 onto different sections of the target area 106 as the apparatus 100 is moved with respect to the target area 106. In addition, or alternatively, the target area 106 may be provided on a movable bed (not shown) and the movable bed may be moved in X, Y, and/or Z directions with respect to the apparatus 100 to position different locations of the target area 106 in line with the apparatus 100.

The build material particles 112 may include any suitable material for forming a 3D object including, but not limited to, plastics, polymers, metals, nylons, and ceramics and may be in the form of a powder, a powder-like material, a fluid, a gel, or the like. References made herein to "powder" should also be interpreted as including "power-like" materials. Additionally, in instances in which the build material particles 112 is in the form of a powder, the build material particles 112 may be formed to have dimensions, e.g., widths, diameters, or the like, that are generally between about 5 μm and about 100 μm. In other examples, the build material particles 112 may have dimensions that may generally be between about 30 μm and about 60 μm. The build material particles 112 may generally have spherical shapes, for instance, as a result of surface energies of the particles in the build material and/or processes employed to fabricate the particles. The term "generally" may be defined as including that a majority of the particles in the build material particles 112 have the specified sizes and spherical shapes. In other examples, the term "generally" may be defined as a large percentage, e.g., around 80% or more of the particles have the specified sizes and spherical shapes. The build material particles 112 may additionally or alternatively include short fibers that may, for example, have been cut into short lengths from long strands or threads of material. According to one example, a suitable build material may be PA12 build material commercially known as V1R10A "HP PA12" available from HP Inc.

As shown in in FIG. 1B, the target area 106 may include a first area 114 and a second area 116 at which the build material particles 112 in those areas are to be fused. By way of example, the build material particles 112 in the first area 114 and the second area 116 may be distinguished from the other areas of the target area 106 through selective application of a fusing (or equivalently, coalescing) agent onto the first area 114 and the second area 116. The fusing agent may be a substance that may act as a catalyst for determining whether application of energy results in the fusing of the build material particles 112. The fusing agent may be applied through use of a suitable fusing agent applicator (not shown). In addition, the first area 114 and the second area 116 may be areas of the target area 106 that may be fused to form portions of a 3D object or portions of multiple 3D objects. As such, multiple layers 108 of the build material particles 112 may include selected areas of fused build material particles 112 such that the selectively fused build material particles 112 in the layers 108 may be fused to form the 3D object or objects.

According to examples, a fusing agent, which may also be a coalescing agent, or the like, may enhance absorption of energy from the apparatus 100 to heat the build material particles 112 to a temperature that is sufficient to cause the build material particles 112 upon which the fusing agent has been deposited to melt, fuse, cure, sinter, cause a reaction with another material, or otherwise fuse prior to or as part of being joined. In addition, the apparatus 100 may apply energy at a level (and/or a wavelength) that causes the build material particles 112 upon which the fusing agent has been applied to be fused without causing the build material particles 112 upon which the fusing agent has not been applied to be fused together.

According to one example, a suitable agent may be an ink-type formulation including carbon black, such as, for example, the agent formulation commercially known as V1Q60A "HP fusing agent" available from HP Inc. The carbon black agent may be used to fuse particles that form interiors, e.g., hidden core portions, of 3D parts, while agents having lighter colors and/or greater translucency may be used to fuse particles that form exteriors of the 3D parts. In one example, such an agent may additionally include an infra-red light absorber. In one example such agent may additionally include a near infra-red light absorber. In one example, such an agent may additionally include a visible light absorber. In one example, such an agent may additionally include a UV light absorber. Examples of agents including visible light enhancers are dye based colored ink and pigment based colored ink, such as inks commercially known as CE039A and CE042A available from HP Inc.

As shown in FIGS. 1A and 1B, the apparatus 100 may include a back panel 120, a transparent panel 122, and side panels 124. The back panel 120 may be positioned above the energy emitter 104 and the transparent panel 122 may be positioned below the energy emitter 104. In addition, the side panels 124 may be positioned on each side of the energy emitter 104. As such, the back panel 120, the transparent panel 122, and the side panels 124 may form a channel 126 within which the energy emitter 104 may be positioned. The transparent panel 122 may form an airtight seal with the side panels 124 to prevent build material particles 112 from entering into the channel 126 and potentially blocking part of the energy 102 emitted by the energy emitter 104.

According to examples, the back panel 120 may absorb energy, e.g., the reflected energy 110. For instance, the back panel 120 may include an energy absorbing element 130 that is provided on a surface of the back panel 120 that faces the energy emitter 104. The energy absorbing element 130 may be a coating or another type of material that may absorb energy. For instance, the energy absorbing element 130 may be any suitable material and may have any suitable color, e.g., a black colored coating, a black fire resistant material, or the like, that may absorb energy in a visible light and/or in the infrared wavelength range, and may dissipate the energy in the form of heat. The energy absorbing element 130 may be formed of, for instance, a high temperature ceramic coated with a high emissivity, high temperature enamel, radio absorbing coatings, geometrically complex surface treatments that may absorb target energy, e.g., metamaterials, polymer, metal, ceramic foams, etc., or the like. The heat dissipated from the energy absorbing element 130 may flow through the transparent panel 122 and may heat the build material particles 112 in the target area 106 to reach or be maintained at a temperature that is below a melting point temperature of the build material particles 112. For instance, the energy absorbing element 130 may dissipate heat in the infrared wavelength range.

The back panel 120 may be formed of a metallic material, e.g., titanium, aluminum, silver, copper, or the like, a ceramic material, or the like, etc. In some examples, the back panel 120 may have a sufficient thickness to cause and/or maintain uniformity of the heat dispersion across the back panel 120. For instance, the back panel 120 may have a thickness in the range of, for instance, about 1 mm and about 5 mm.

The side panels 124 may be formed of a metallic material, e.g., aluminum, silver, copper, or the like, a ceramic material, or the like, etc. In addition, the side panels 124 may include reflective interior surfaces that may reflect energy 102, 110. For instance, the reflective interior surfaces of the side panels 124 may reflect energy 102 emitted from the energy emitter 104 toward the build material layer 108. In addition or alternatively, the reflective interior surfaces of the side panels 124 may reflect the reflected energy 110 toward the back panel 120.

The energy emitter 104 may be a resistive energy emitter and may include an energy emitting element 132 that may emit the energy 102 as electricity is applied through the energy emitting element 132. The energy emitting element 132 may be formed of any suitable material including, for instance, tungsten, or the like, and may include any suitable energy emitting device, such as a resistive coil or other type of device. The energy emitting element 132 may be encased in an outer tube 134 to protect the energy emitting element 132 in the energy emitter 104. The outer tube 134 may be a transparent shielding and may be made of a material that may withstand energy 102 emitted from the energy emitting element 132, e.g., may remain intact as the energy 102 is emitted through the outer tube 134. For instance, the outer tube 134 may be formed of a clear glass, quartz, or the like. In addition, the outer tube 134 may have a circular cross-sectional shape.

As shown in FIGS. 1A and 1B, a reflective element 136 may be provided on a portion of the outer tube 134 facing the back panel 120. For instance, the reflective element 136 may be provided on a portion of an outer surface or an inner surface of the outer tube 134. By way of example, the reflective element 136 may be provided on greater than about 50% of the outer surface of the outer tube 134 that faces the back panel 120. For instance, the reflective element 136 may span about 220° across a diameter of the outer tube 134, in which a center of the reflective coating 138 faces the back panel 120. In other words, a first section of the reflective coating 138 may extend about 110° in a first direction from a line that extends perpendicularly from the back panel 120 to the energy emitter 104 of the and a second section of the reflective coating 138 may extend about 110° in a second direction from the line. In some examples, the reflective element 136 may span between greater than about 180° and less than about 360° relative to the horizontal axis of the outer tube 134. By way of particular example, the reflective element 136 may span between about 210° and 230° relative to the horizontal axis of the outer tube 134.

The reflective element 136 may include a mirrored or highly reflective interior surface such that the energy 102 emitted from the energy emitting element 132 and directed toward the reflective element 136 may be reflected from the interior surface of the reflective element 136. That is, the reflective element 136 may have a reflectance level that causes the reflective element 136 to reflect at least around 90% of the emitted energy 102. That is, for instance, the reflective element 136 may prevent less than around 10% loss or absorption of the emitted energy 102 that is directed to the reflective element 136. In other examples, the reflective element 136 may prevent a lower amount of energy loss or absorption, e.g., less than around 1% loss or absorption. In any regard, the reflective element 136 may reflect the emitted energy 102 that is directed in a direction toward the back panel 120 toward the build material layer 108. In this regard, the reflective element 136 may focus the emitted energy 102 toward the build material layer 108 as denoted by the arrows emitted from the energy emitting element 132 toward the build material layer 108. In any regard, the reflective element 136 may be formed of a metalized coating such as aluminum oxide, a ceramic oxide, and/or the like.

The energy 102 emitted from the energy emitting element 132 may pass through the outer tube 134 and may be directed in multiple directions out of the energy emitter 104 toward the build material layer 108 as shown in FIG. 1A. It should be understood that a small number of lines denoting the emitted energy 102 and the reflected energy 110 have been shown for purposes of simplicity of illustration and that the emitted energy 102 may be directed out of the energy emitter 104 in any direction other than the directions that the reflective element 136 covers. As a result, the energy 102 emitted from the energy emitter 104 may not be directed toward the back panel 120, but instead, may be focused toward the build material layer 108. In any regard, the emitted energy 102 may be directed onto the target area 106 with a high level of intensity. That is, the emitted energy 102 at the target area 106 may have an intensity level that nearly matches the intensity level of the energy 102 at the energy emitter 104. By way of example, the intensity level at the target area 106 may be within about 10% of the intensity level of the energy 102 at the energy emitter 104.

According to examples, the build material particles 112 may be formed of light colored, e.g., white, powder or powder-like material. In addition, the energy emitter 104 may output energy 102 at a first wavelength that the build material particles 112 may not absorb or may absorb at a relatively low level (e.g., at a sufficiently low level such that absorption of the energy may not cause the build material particles 112 to melt, fuse, sinter, etc. Instead, the first wavelength may be a wavelength that a fusing agent applied on the build material particles 112 may absorb at a relatively high level (e.g., at a sufficiently high level to cause the build material particles 112 on which the fusing agent has been applied to melt, fuse, sinter, etc.). As a result, the build material particles 112 upon which the fusing agent has not been applied may not absorb or may absorb an insufficient amount of the emitted energy 102 to cause the build material particles 112 to melt. However, the build material particles 112 on which the fusing agent has been applied may become sufficiently heated to cause the build material particles 112 to melt.

As the build material particles 112 may not absorb or may absorb less than all of the emitted energy 102 applied onto the build material particles 112, the emitted energy 102 applied onto the build material particles 112 may reflect back toward the back panel 120. The reflected energy 110 is shown in FIG. 1A as dashed lines. As discussed herein, the back panel 120 may absorb the reflected energy 110 such that the reflected energy 110 may not be reflected back toward the build material layer 108. That is, the energy absorbing element 130 may be formed of and/or may include a black, light absorbing material that may withstand temperatures greater than around 2000 Kelvin, while in other examples, the energy absorbing element 130 may withstand higher or lower maximum temperatures. By way of particular example, the energy absorbing element 130 may include and/or may be formed of an energy absorbing material that may remain intact while being subjected to temperatures above around 2700 Kelvin. As a result, when the reflected energy 110 is directed to and hits the energy absorbing element 130, the energy absorbing element 130 may absorb all or most of that reflected energy 110. By way of particular example, the energy absorbing element 130 may absorb greater than about 50% of the reflected energy 110 hitting the energy absorbing element 130. As other examples, the energy absorbing element 130 may absorb greater than about 90% of the reflected energy 110 hitting the energy absorbing element 130. In yet other examples, the energy absorbing element 130 may absorb greater than about 95% of the reflected energy 110 hitting the energy absorbing element 130.

In instances in which the energy absorbing element 130 is not present in the back panel 120, the reflected energy 110 may be reflected around interior surfaces of the apparatus 100 until the energy 110 is absorbed by a material that may absorb the energy 110. That is, the reflected energy 110 may continue to be reflected in the apparatus 100 until the reflected energy 110 hits fusing agent applied in the target area 106. In instances in which a fusing agent is applied onto a relatively small section of the target area 106, e.g., such as the first area 114 shown in FIG. 1B, there may be a large amount of reflected energy 110. As such, the fusing agent on the first area 114 may absorb a larger amount of energy 102, 110 than intended. As a result, the fusing agent in the first area 114 and the build material particles 112 on which the fusing agent is applied may be heated to a higher than intended temperature, which may cause the build material particles 112 in the first area 114 to melt improperly and thus, may cause defects in a 3D object fabricated from the build material particles 112.

However, in instances in which a fusing agent is applied onto a relatively large section of target area 106, e.g., such as the second area 116 shown in FIG. 1B, there may be less reflected energy 110 and the fusing agent and the build material particles 112 in the second area 116 may be heated to or near the intended temperature. As a result, the build material particles 112 in the second area 116 may be fused as intended and may result in the formation of a 3D object having fewer or no defects.

As shown in FIG. 1A, the emitted energy 102 may pass through the transparent panel 122 prior to reaching the build material layer 108. In this regard, the transparent panel 122 may be formed of a transparent material that may withstand heat caused by the emitted energy, e.g., a clear glass, quartz, or the like. That is, the transparent panel 122 may be formed of a transparent material that the emitted energy 102 may warp or otherwise damage the transparent panel 122. In some examples, an anti-reflective coating 138 may be applied to either or both of the exposed surfaces of the transparent panel 122. The anti-reflective coating 138 may be provided to prevent or reduce reflection of the emitted energy 102 toward the back panel 120 and may prevent or reduce reflection of the reflected energy 110 back toward the build material layer 108. The anti-reflective coating 136 may include any suitable material and may be applied through any suitable technique that may enable the reduction in reflection of the emitted energy 102 and/or the reflected energy 110 while also being able to withstand the energy 102, 110.

Figure 2:
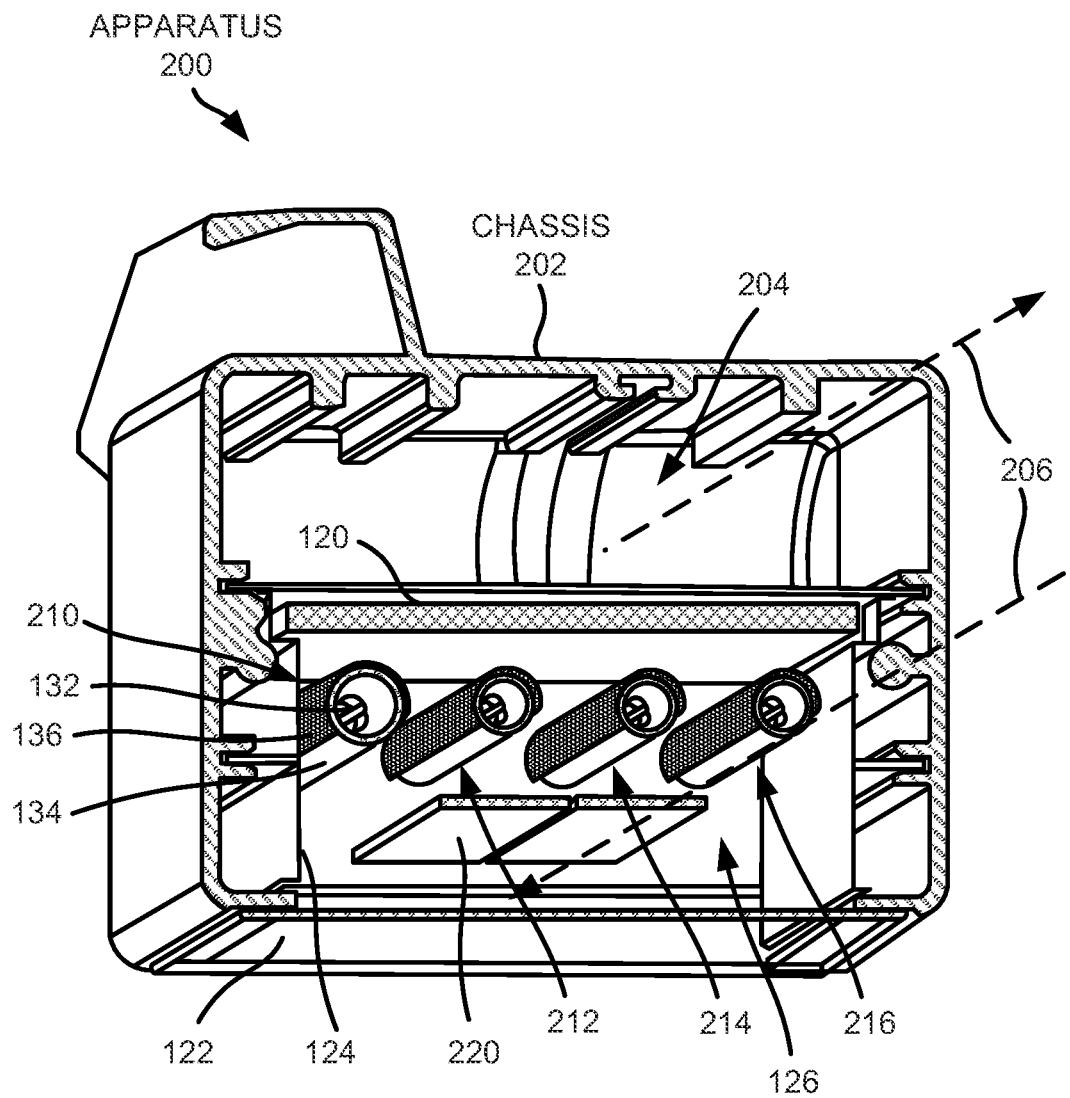
FIG. 2 depicts a perspective view, partially in cross section, of an example apparatus for heating a build material layer to, for instance, fuse build material particles in selected locations in the build material layer.

Turning now to FIG. 2, there is shown a perspective view, partially in cross section, of an example apparatus 200 for heating a build material layer 108 to, for instance, fuse build material particles 112 in selected locations in the build material layer 108. It should be understood that the example apparatus 200 depicted in FIG. 2 may include additional components and that some of the components described herein may be removed and/or modified without departing from the scope of the example apparatus 200 disclosed herein.

The apparatus 200 may include many of the same features as those discussed above with respect to the apparatus 100 depicted in FIGS. 1A and 1B. As such, the common features have been labeled to include the same reference numerals in FIG. 2. In addition, in the following description of FIG. 2, the common features are not described in detail as those features have been described with respect to FIGS. 1A and 1B.

As shown in FIG. 2, the apparatus 200 may include a chassis 202 that may house the back panel 120, the transparent panel 122, and the side panels 124 in a manner to form the channel 126. The chassis 202 may also include a plenum 204 through which air or other gas may flow to, for instance, cool the energy emitters housed in the channel 126. Particularly, a gas may flow through the channel 126 and the plenum 204 as denoted by the dashed arrows 206. In other examples, a gas may flow in a direction opposite to the direction of the arrows 206. In any regard, the chassis 202 may be formed of any suitable material that is of sufficient strength to rigidly support the components housed in the chassis 202. For instance, the chassis 202 may be formed of metal, plastic, resin, composite, and/or the like material.

The apparatus 200 may differ from the apparatus 100 depicted in FIGS. 1A and 1B in that the apparatus 200 may include components in addition to those discussed above with respect to the apparatus 100. For instance, the apparatus 200 may include multiple energy emitters 210-216. Each of the energy emitters 210-216 may be similar to the energy emitter 104 and may thus include an energy emitting element 132 and an outer tube 134. In addition, each of the energy emitters 210-216 may include a respective reflective element 138 that may span over a portion of the outer tube 134 in similar manners to those discussed above with respect to FIGS. 1A and 1B.

As shown in FIG. 2, one of the energy emitters 210 may differ from the other, e.g., additional, energy emitters 212-216. For instance, one of the energy emitters 210 may emit energy at a peak wavelength that differs from the peak wavelength at which the other energy emitters 212-216 emit energy. That is, the energy emitting element 132 in one of the energy emitters 210 may have a different size as compared with the energy emitting elements 132 in the other energy emitters 210, e.g., may be larger, and/or may be more densely packed. In some examples, the energy emitter 210 with the larger energy emitting element 132 may emit energy at a peak wavelength that may be tuned to heat the build material particles 112 to a temperature that is close to, but below the melting point temperature of the build material particles 112. For instance, the energy emitter 210 may emit energy at a wavelength that may cause the build material particles 112 to reach a temperature that is between about 10° C. and about 25° C. below the melting point temperature of the build material particles 112. The temperature may be based on the type of the build material particles 112. In addition, the other energy emitters 212-216 may emit energy at wavelengths to cause build material particles 112 upon which a fusing agent has been deposited to melt as discussed above with respect to the energy emitter 104.

As also shown in FIG. 2, the apparatus 200 may include filters 220 that may absorb part of the energy 102 emitted from the energy emitters 212-216 that is in a particular wavelength range. That is, the filters 220 may absorb energy having a range of wavelengths that the build material particles 112 readily absorb. By way of example, the filters 220 may absorb energy in the mid-infrared wavelength range. In some examples, the filters 220 may be formed of borofloat glass.

Figure 3:
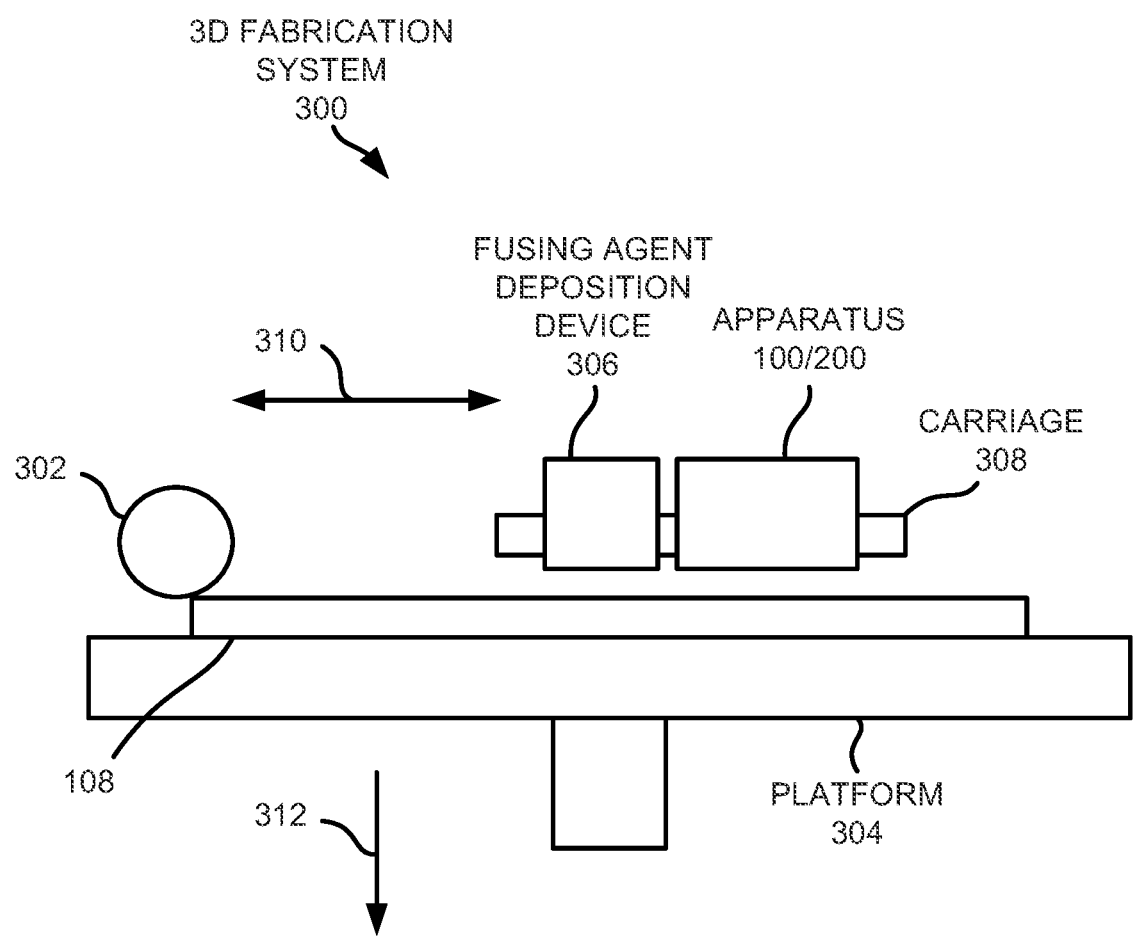
FIG. 3 depicts a block diagram of an example 3D fabrication system that may include the apparatus depicted in FIGS. 1A, 1B, and 2.

With reference now to FIG. 3, there is shown a block diagram of an example three-dimensional (3D) fabrication system 300 that may include the apparatus 100, 200 for heating a build material layer 108 to fuse build material particles 112 in selected locations in the build material layer 108. It should be understood that the example 3D fabrication system 300 depicted in FIG. 3 may include additional components and that some of the components described herein may be removed and/or modified without departing from the scope of the example 3D fabrication system 300 disclosed herein.

As shown in FIG. 3, the 3D fabrication system 300 may include a spreader 302, a platform 304, a fusing agent deposition device 306, and a carriage 308. The spreader 302 may spread a build material layer 108 onto the platform 304 and the fusing agent deposition device 306 may apply a fusing agent onto selected areas of the build material layer 108. That is, the carriage 308 may move across the build material layer 108 as indicated by the arrow 310 and as the carriage 308 moves, the fusing agent deposition device 306 may selectively deposit fusing agent onto the build material layer 108, e.g., onto the areas of the build material layer 108 that are to be fused together to form part of a 3D object. In addition, the apparatus 100, 200 may apply energy 102 onto the build material layer 108 to fuse the build material particles 112 upon which the fusing agent has been deposited as discussed herein. As shown, the carriage 308 may support the apparatus 100, 200 and the apparatus 100, 200 may apply the energy 102 as the carriage 308 is moved across the build material layer 108.

Following application of the fusing agent and the energy 102 onto the build material layer 108, the platform 304 may be moved downward as denoted by the arrow 312. In addition, the spreader 302 may spread another layer on the build material layer 108. The carriage 308 may be moved over the other layer and the fusing agent deposition device 306 and the apparatus 100, 200 may be implemented while the carriage 308 is moved to form another portion of the 3D object in the other layer. This process may be repeated for additional layers until the 3D object is fabricated.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) fabrication system comprising:
    a fusing agent deposition device to deposit a fusing agent onto build material particles in a build material layer; and
    a heating apparatus comprising:
    a back panel including an energy absorbing element that absorbs and dissipates energy, wherein energy dissipated from the energy absorbing element flows through a transparent panel and heats the build material particles;
    an energy emitting element to supply energy onto the build material layer and the fusing agent deposited on the build material layer;
    a reflective element positioned between the energy emitting element and the back panel to direct energy from the energy emitting element away from the back panel; and
    the transparent panel positioned between the energy emitting element and the build material layer, wherein the energy from the energy emitting element is to be emitted through the transparent panel and onto the build material layer.

2. The 3D fabrication system of claim 1, further comprising
    a tube encasing the energy emitting element, wherein the tube includes a circular cross sectional shape and wherein the reflective element is attached to the tube and a center of the reflective element faces the back panel.

3. The 3D fabrication system of claim 1, wherein the back panel includes the energy absorbing element to absorb energy having a first range of wavelengths and to emit energy having a second range of wavelengths.

4. The 3D fabrication system of claim 1, wherein the back panel comprises a thickness that is to maintain a uniform level of energy dispersion across the back panel.

5. The 3D fabrication system of claim 2, further comprising:
- a plurality of additional energy emitting elements, each additional energy emitting element of the plurality of additional energy emitting elements including a respective tube surrounding the additional energy emitting element, and a respective reflective element provided on the additional energy emitting element to block energy emitted from the additional energy emitting element from being directed toward the back panel and to direct the energy toward the transparent panel.

6. The 3D fabrication system of claim 2, further comprising:
- side panels attached to the back panel and the transparent panel, wherein the back panel, the side panels, and the transparent panel form a channel that encases the energy emitting element and the reflective element.

7. The 3D fabrication system of claim 2, wherein the transparent panel includes an anti-reflective coating to reduce reflection by the transparent panel of the energy generated from the energy emitting element.

8. A three-dimensional (3D) fabrication system comprising:
- a platform to support a build material layer;
- a movable carriage to move across the platform;
- a fusing agent deposition device to deposit a fusing agent onto the build material layer; and
- a heating apparatus comprising:
  - a back panel including an energy absorbing element that absorbs and dissipates energy, wherein energy dissipated from the energy absorbing element flows through a transparent panel and heats the build material particles;
  - an energy emitting element to supply energy onto the build material layer and the fusing agent deposited on the build material layer;
  - a reflective element positioned between the energy emitting element and the back panel to direct energy from the energy emitting element away from the back panel; and
  - the transparent panel positioned between the energy emitting element and the build material layer, wherein the energy from the energy emitting element is to be emitted through the transparent panel and onto the build material layer.

9. The 3D fabrication system of claim 8, wherein the reflective element spans between greater than 180° and less than 360° relative to a horizontal axis of the energy emitting element, and wherein a center of the reflective element faces the back panel.

10. The 3D fabrication system of claim 8, further comprising
- a filter positioned between the energy emitting element and the transparent panel to absorb part of the energy emitted from the energy emitting element in a particular wavelength range.

* * * * *